3,203,755
PROCESS FOR THE PREPARATION OF SODIUM SILICATE
Richard K. Rathmell, Wilmington, Del., assignor to E. I. du Pont de Nemours and Company, Wilmington, Del., a corporation of Delaware
No Drawing. Filed Aug. 3, 1962, Ser. No. 214,488
2 Claims. (Cl. 23—110)

This invention relates to the preparation of sodium silicate which upon being dissolved in water forms solutions of unusual clarity and is more particularly directed to processes and to products in which titanium dioxide is added to the customary melt of sodium carbonate and sand which is used to form sodium silicate.

Processes for the production of sodium silicate by fusion of an alkali with sand are conventional. Sodium carbonate is ordinarily used in the proportion desired to give a sodium silicate of desired $SiO_2:Na_2O$ weight ratio. The $SiO_2:Na_2O$ weight ratio ordinarily ranges from about 3.1:1 to 3.3:1 and preferably about 3.25:1. The mixture is customarily fused, cooled, and dissolved in hot water, sometimes under pressure. Dissolving under pressure is much more rapid and is customarily used.

Solutions as thus produced do not ordinarily have as great clarity as is desired and clarity is often improved as by filtration. The problem of lack of clarity becomes more severe as the temperature and pressure of dissolving increase.

According to the present invention improved clarity is obtained by adding titanium dioxide to the materials to be fused together. The titanium dioxide can be added to the sodium carbonate, to the sand, or can be added after the materials have been brought together. It is most convenient to add the titanium dioxide while the sodium carbonate and sand are being mixed in a pre-mixer from which the materials then pass to a so-called glass furnace.

The amount of titanium dioxide to use can be widely varied depending upon the extent of clarification desired. Ordinarily about 400 parts per million of titanium dioxide should be used based upon sand. Larger amounts can be used with an increase in benefit though above around 500 to 600 parts per million of titanium only slight improvement is seen with further additions. Even larger amounts can be used up to, say, 1500 parts per million or 3000 parts per million with some increase in clarity. It will be understood, however, that it will not ordinarily be desirable to use more than, say 3000 parts per million because of the introduction of a foreign material and because there is no correlative advantage to justify the expense.

The addition of titanium dioxide to improve clarity does not adversely affect the properties of the sodium silicate solution for customary purposes.

While the amount of titanium dioxide to be used is expressed above as an amount added to the mixture, it will be understood that this is a rule of thumb. Sands which customarily are used for making sodium silicate contain small amounts of titanium, usually less than 100 parts per million based upon sand. If a sand contains a considerable amount of titanium one can take this into account by saying that generally there should be present in the mix about 8 moles of titanium for each mole of calcium. Larger amounts of titanium can be used but about 4 moles per mole of calcium represents the practical minimum.

After sodium silicate is prepared according to the present invention, it can be dissolved in the customary way to form a sodium silicate solution.

So that the invention may be better understood, reference should be had to the following illustrative example:

*Example*

151 parts by weight of sodium carbonate were mixed with 288 parts by weight of sand. At the same time there was added 0.30 part by weight of titanium dioxide. After $TiO_2$ addition, the sand contained 1100 parts per million by weight of titanium computed as $TiO_2$ so that the total titanium is 7.96 moles of titanium for each mole of calcium in the sand. The sand originally contained 60 parts per million by weight of titanium dioxide and 97 parts per million of calcium oxide.

The mixture thus prepared was heated to 2300-2400° F. to make a fused mass and this was discharged from the furnace and cooled. It was thereafter dissolved in water at a pressure of 60 lbs. per sq. in. gauge and at a temperature of 153° C. Sufficient water was used to make a 37% solution which had an $SiO_2:Na_2O$ weight ratio of 3.25:1.

Similar processes are carried out just as above but there is added respectively 1270 parts per million, 635 parts per million, and 1500 parts per million of titanium dioxide based on sand.

The claims are:
1. In a process of making sodium silicate by fusing sand with sodium carbonate, including 400 to 3000 parts per million of titanium dioxide based upon sand to increase clarity of silicate solutions subsequently made by dissolving the sodium silicate in water.
2. In a process of making sodium silicate by fusing sand with sodium carbonate, including titanium dioxide in such amount that the titanium added taken together with titanium already present in the sand will be at least 4 moles of titanium for each mole of calcium in the sand.

References Cited by the Examiner
UNITED STATES PATENTS
2,988,423   6/61   McDaniel _____ 23—110.1

MAURICE A. BRINDISI, *Primary Examiner*.